(12) United States Patent
Wu

(10) Patent No.: US 7,969,669 B1
(45) Date of Patent: Jun. 28, 2011

(54) LENS MODULE

(75) Inventor: Cheng-Shiun Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/788,302

(22) Filed: May 27, 2010

(30) Foreign Application Priority Data

Dec. 4, 2009 (CN) .......................... 2009 1 0310933

(51) Int. Cl.
*G02B 7/02* (2006.01)

(52) U.S. Cl. ........ 359/823; 359/811; 359/819; 359/824; 359/825; 348/360; 348/369; 348/373; 348/374; 348/340

(58) Field of Classification Search .................. 359/811, 359/819–829, 694–701; 348/340, 360, 369, 348/373, 374; 372/65, 103, 107, 108; 396/72–75, 396/89, 144, 150, 353, 533
See application file for complete search history.

(56) References Cited

U.S. PATENT DOCUMENTS

| | | | | |
|---|---|---|---|---|
| 3,272,327 A * | 9/1966 | Busch | .............................. | 401/78 |
| 3,773,405 A * | 11/1973 | Sugano | .......................... | 359/825 |
| 4,156,469 A * | 5/1979 | Laskey | .............................. | 175/58 |
| 4,395,096 A * | 7/1983 | Gibson | .......................... | 359/422 |
| 5,448,587 A * | 9/1995 | Huang | .......................... | 372/107 |
| 5,806,964 A * | 9/1998 | Maglica | .......................... | 362/203 |
| 6,359,682 B1 * | 3/2002 | Park | .............................. | 356/28.5 |
| 7,009,654 B2 * | 3/2006 | Kuno et al. | ......................... | 348/374 |
| 7,221,524 B2 * | 5/2007 | Ye et al. | ......................... | 359/819 |
| 7,460,317 B2 * | 12/2008 | Webster et al. | ............... | 359/811 |
| 7,697,061 B2 * | 4/2010 | Chang | .......................... | 348/369 |
| 7,715,130 B2 * | 5/2010 | Tsai | .............................. | 359/824 |
| 2008/0309807 A1 * | 12/2008 | Kinoshita et al. | ............. | 348/294 |
| 2008/0309814 A1 * | 12/2008 | Kinoshita et al. | ............. | 348/340 |
| 2009/0219433 A1 * | 9/2009 | Higuchi | ........................ | 348/340 |

* cited by examiner

*Primary Examiner* — Loha Ben
(74) *Attorney, Agent, or Firm* — Raymond J. Chew

(57) ABSTRACT

A lens module includes a holder, a barrel, a lens, and a focus ring. The barrel is accommodated in the holder and threadedly coupled to the holder. The lens is received in the barrel. The focus ring surrounds and is securely fixed with the barrel. The focus ring is sandwiched between the holder and the barrel. The focus ring has at least two protrusions formed on an outer surface thereof. The at least two protrusions are symmetrical about a center of the focus ring.

17 Claims, 2 Drawing Sheets

LENS MODULE

BACKGROUND

1. Technical Field

The present disclosure relates to optical imaging, and particularly to a lens module.

2. Description of Related Art

A typical lens module includes a barrel and a holder. To achieve focusing, the barrel is rotated relative to the holder. Usually, the torsion needed to rotate the barrel should be in a predetermined range. When the torsion needed is greater than the predetermined range, the lens module might be unsatisfactory.

Therefore, it is desirable to provide a new lens module, which can overcome the above-mentioned limitations.

DETAILED DESCRIPTION

Figure 1:
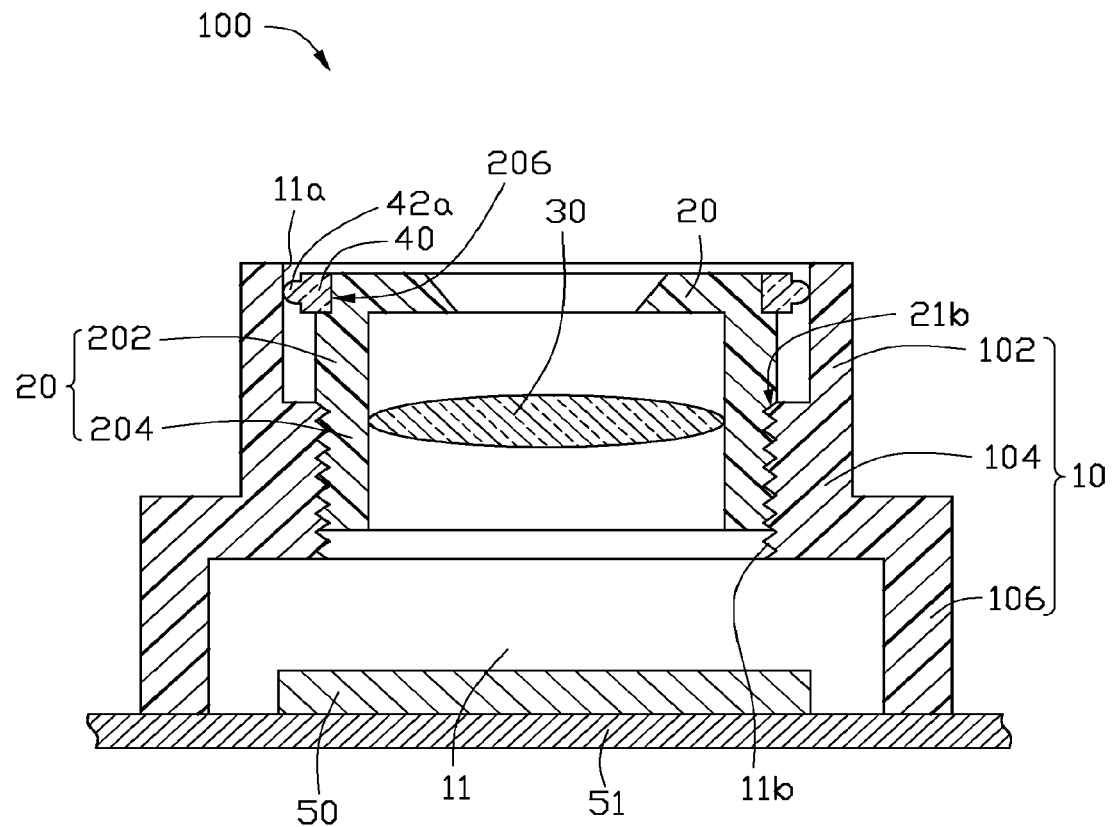
FIG. 1 is a side cross-sectional view of a lens module with a sensor, according to an embodiment.
Figure 2:
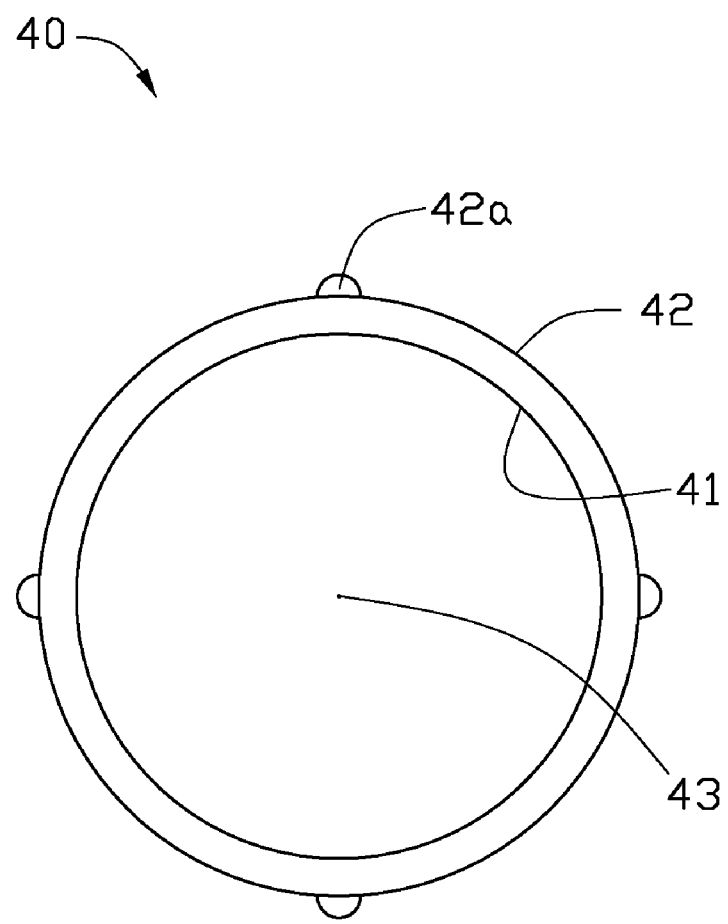
FIG. 2 is a top view of a ring of the lens module of FIG. 1.

Referring to FIGS. 1-2, a lens module 100 according to an embodiment is shown. The lens module 100 includes a holder 10, a focusing barrel 20, a lens 30, and a ring 40.

The holder 10 is a stepped cylinder and defines a stepped through hole 11. The holder 10 includes a first part 102, a second part 104, and a third part 106 in order from an object side to an image side. An inner diameter of the first part 102 is larger than that of the second part 104. The holder 10 includes an internal screw thread 11b formed on the inner surface of the second part 104.

The barrel 20 is cylindrical and has a receiving space defined therein. The lens 30 is received in the receiving space. The barrel 20 includes a first portion 202 and a second portion 204. A circular recess 206 is defined around an outer cylindrical surface of the first portion 202 and located at a free end of the first portion 202. An external screw thread 21b is formed on an outer cylindrical surface of the second portion 204. The external screw thread 21b is engaged with the internal screw thread 11b. The first portion 202 is spaced apart from the first part 102.

The ring 40 includes an inner surface 41, an outer surface 42, and at least two protrusions 42a formed on the outer surface 42. The ring 40 surrounds the first portion 202 of the barrel 20 and engages in the circular recess 206. The ring 40 is firmly adhered to the barrel 20 via e.g., an adhesive. The ring 40 is sandwiched between an inner surface 11a of the first part 102 of the holder 10 and the outer surface of the barrel 20. The at least two protrusions 42a are symmetrical about a center 43 of the ring 40. In this embodiment, the ring 40 includes four protrusions 42a evenly distributed on the outer surface 42. The ring 40 may be made of the same material as the barrel 20, for example, plastic. The ring 40 may be integrally formed with the barrel 20. In this embodiment, each of the protrusions 42a is hemispherical. In alternative embodiments, each of the protrusions 42a can be hemi-cylindrical.

In this embodiment, a sensor 50 can be provided and received in the through hole 11 of the holder 10. The sensor 50 can be arranged on a circuit board 51. In operation, the barrel 20 is rotated relative to the holder 10 to achieve ing. In test, if the torsion needed to rotate the barrel 20 relative to the holder 10 is greater than a predetermined torsion during focusing, the lens module 100 may fail to reach a required standard. In this case, the barrel 20, together with the ring 40, is detached from the holder 10, and the protrusions 42a are ground/polished to be smoother and smaller. In this way, the torsion needed to rotate the barrel 20 relative to the holder 10 is decreased so that the corrected lens module 100 meets the required standard.

While various embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. A lens module, comprising:
a holder;
a barrel accommodated in the holder and threadedly coupled to the holder;
a lens received in the barrel; and
a ring surrounding and securely fixed with the barrel, the ring being sandwiched between the holder and the barrel, the ring having at least two protrusions formed on an outer surface thereof, the at least two protrusions being symmetrical about a center of the ring.

2. The lens module of claim 1, wherein each protrusion is hemispherical or hemi-cylindrical.

3. The lens module of claim 1, wherein the at least two protrusions are evenly distributed on the outer surface.

4. The lens module of claim 1, wherein the ring and the barrel are made of the same material.

5. The lens module of claim 1, wherein the ring and the barrel are integrally formed with each other.

6. The lens module of claim 1, wherein the ring is made of plastic.

7. A lens module, comprising:
a holder;
a barrel received in the holder and threadedly engaged with the holder;
a lens positioned in the barrel; and
a ring sandwiched between the holder and the barrel and surrounding the barrel.

8. The lens module of claim 7, wherein the ring is made of plastic.

9. The lens module of claim 7, wherein the ring and the barrel are made of the same material.

10. The lens module of claim 7, wherein the ring and the barrel are integrally formed with each other.

11. The lens module of claim 7, wherein the ring comprises at least two protrusions formed on an outer surface thereof, and the at least two protrusions contact an inner surface of the holder.

12. The lens module of claim 11, wherein each of the at least two protrusions is hemispherical or hemi-cylindrical.

13. The lens module of claim 11, wherein the at least two protrusions are evenly distributed on the outer surface.

14. The lens module of claim 11, wherein the holder comprises a first part and a second part, and an internal screw thread is formed on an inner surface of the second part; the barrel comprises a first portion and a second portion, and an external screw thread is formed on an outer surface of the second portion; the external screw thread is engaged with the internal screw thread; the first portion is spaced apart from the first part.

15. The lens module of claim 14, wherein the ring is positioned between an inner surface of the first part and an outer surface of the first portion.

16. The lens module of claim 15, wherein a circular recess is defined around the outer surface of the first portion and located at a free end of the first portion, and the ring is positioned in the circular recess.

17. The lens module of claim 7, wherein the holder is a stepped cylinder.

* * * * *